(12) United States Patent
D'Aluisio

(10) Patent No.: US 9,248,883 B2
(45) Date of Patent: Feb. 2, 2016

(54) BICYCLE FORK WITH COMPLIANT TIP

(71) Applicant: Specialized Bicycle Components, Inc., Morgan Hill, CA (US)

(72) Inventor: Christopher P. D'Aluisio, Corralitos, CA (US)

(73) Assignee: SPECIALIZED BICYCLE COMPONENTS, INC., Morgan Hill, CA (US)

( * ) Notice: Subject to any disclaimer, the term of this patent is extended or adjusted under 35 U.S.C. 154(b) by 0 days.

(21) Appl. No.: 14/189,511

(22) Filed: Feb. 25, 2014

(65) Prior Publication Data

US 2014/0265225 A1    Sep. 18, 2014

Related U.S. Application Data

(60) Provisional application No. 61/779,874, filed on Mar. 13, 2013.

(51) Int. Cl.
*B62K 25/04* (2006.01)
*B62K 21/02* (2006.01)

(52) U.S. Cl.
CPC ............... *B62K 21/02* (2013.01); *B62K 25/04* (2013.01); *B62K 2025/041* (2013.01)

(58) Field of Classification Search
CPC ............................ B62K 2025/041; B62K 25/04
USPC .............................................. 280/276, 275, 279
See application file for complete search history.

(56) References Cited

U.S. PATENT DOCUMENTS

| | | | |
|---|---|---|---|
| 1,036,263 A * | 8/1912 | Kittle ........................ | 280/277 |
| 1,517,168 A | 11/1924 | Rogers | |
| 2,073,736 A * | 3/1937 | Duffy ........................ | 384/545 |
| 4,186,936 A * | 2/1980 | Offenstadt et al. .......... | 280/277 |
| 4,533,153 A * | 8/1985 | Tsunoda et al. ............. | 280/277 |
| 5,064,212 A | 11/1991 | Yun | |
| RE34,009 E | 7/1992 | Schilplin | |
| 5,364,115 A | 11/1994 | Klein et al. | |
| 5,382,037 A | 1/1995 | Chang et al. | |

(Continued)

FOREIGN PATENT DOCUMENTS

GB    1517168    7/1978

OTHER PUBLICATIONS

International Search Report for Application No. PCT/US2014/018315 dated Jun. 6, 2014 (7 pages).

(Continued)

*Primary Examiner* — Tony Winner
*Assistant Examiner* — Michael Stabley
(74) *Attorney, Agent, or Firm* — Michael Best & Friedrich LLP

(57) ABSTRACT

The present invention provides a bicycle comprising front and rear wheels, a frame supported on the front and rear wheels and including a front fork. The front fork comprises a steerer tube defining a steering axis, a fork blade coupled to and extending downward relative to the steerer tube, and a fork tip coupled between the fork blade and the front wheel. The fork tip includes a first arm extending at an angle of 40-85 degrees relative to the steering axis, a second arm extending at an angle of 70-120 degrees relative to the steering axis, and an axle support coupled between the second arm and the front wheel. In one embodiment, the first arm and second arm define a gap, and the fork tip further includes a resilient member positioned in the gap.

19 Claims, 8 Drawing Sheets

(56) References Cited

U.S. PATENT DOCUMENTS

| | | | |
|---|---|---|---|
| 5,398,954 A | 3/1995 | Chonan | |
| 5,427,397 A | 6/1995 | Chonan | |
| 5,431,426 A * | 7/1995 | Ijams et al. | 280/276 |
| 5,899,478 A * | 5/1999 | Woodside | 280/276 |
| 5,906,385 A | 5/1999 | Voss | |
| 5,931,487 A | 8/1999 | Koppelberg et al. | |
| 6,152,472 A * | 11/2000 | Woodside | 280/277 |
| 6,155,370 A * | 12/2000 | Iwai et al. | 180/222 |
| 6,336,647 B1 * | 1/2002 | Iwai et al. | 280/276 |
| 6,517,096 B2 * | 2/2003 | Yih | 280/283 |
| 6,896,276 B1 * | 5/2005 | Sparrow | 280/276 |
| 7,841,612 B2 | 11/2010 | French | |
| 2002/0063410 A1 | 5/2002 | Buckmiller et al. | |
| 2009/0236817 A1 | 9/2009 | French | |
| 2011/0316251 A1 | 12/2011 | Lumpkin | |

OTHER PUBLICATIONS

Written Opinion for Application No. PCT/US2014/018315 dated Jun. 6, 2014 (6 pages).

* cited by examiner

BICYCLE FORK WITH COMPLIANT TIP

CROSS-REFERENCE TO RELATED APPLICATIONS

This application claims priority to U.S. Provisional Patent Application No. 61/779,874 filed on Mar. 13, 2013, the entire contents of which are incorporated herein by reference.

BACKGROUND

The present invention relates generally to the field of bicycles and specifically to front suspensions for bicycles.

Many bicycles have rigid frames that provide little shock absorbing capabilities and instead rely on pneumatic tires to smooth out the bumps on the riding surface. Mountain bikes are specifically designed for off-road riding and are often equipped with front and/or rear shock absorbers to cushion impact on the wheels. These shock absorbers typically have spring-biased and damped telescoping members that will absorb impacts on the wheels.

Bicycle shock absorbers can be heavy and can also have a considerable amount of unsprung weight. Both of these features can be a significant disadvantage on a road bicycle, for which light weight and precise handling are considered very important.

SUMMARY

The present invention provides a bicycle comprising front and rear wheels, a frame supported on the front and rear wheels and including a front fork. The front fork comprises a steerer tube defining a steering axis, a fork blade coupled to and extending downward relative to the steerer tube, and a fork tip coupled between the fork blade and the front wheel. The fork tip includes a first arm extending at an angle of 20-100 degrees (preferably 40-85 degrees, and more preferably 66 degrees) relative to the steering axis, a second arm extending at an angle of 50-140 degrees (preferably 70-120 degrees, and more preferably 114 degrees) relative to the steering axis, and an axle support coupled between the second arm and the front wheel. In one embodiment, the first arm and second arm define a gap, and the fork tip further includes a resilient member positioned in the gap.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
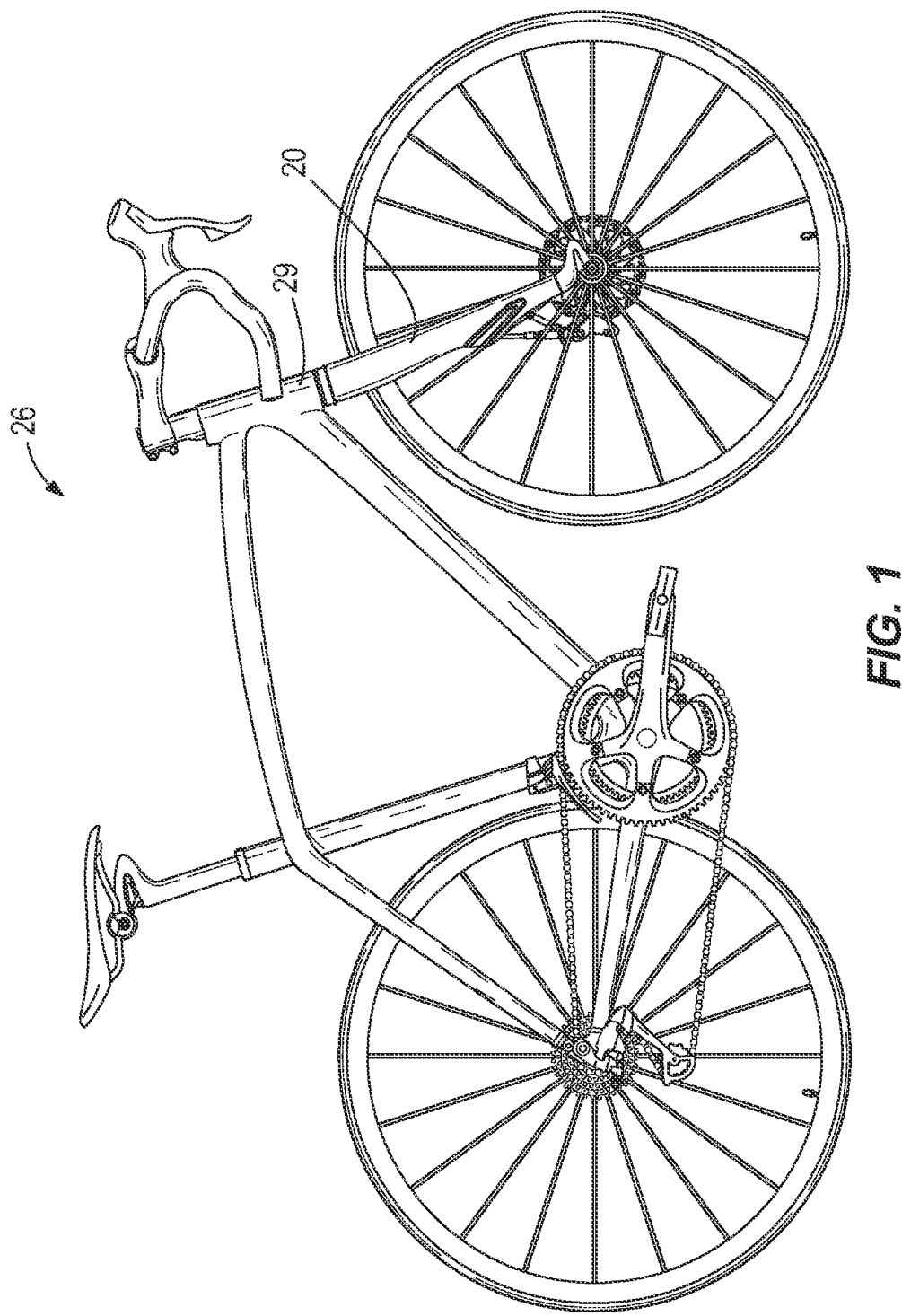
FIG. 1 is a side view of a bicycle embodying the present invention.
Figure 2:
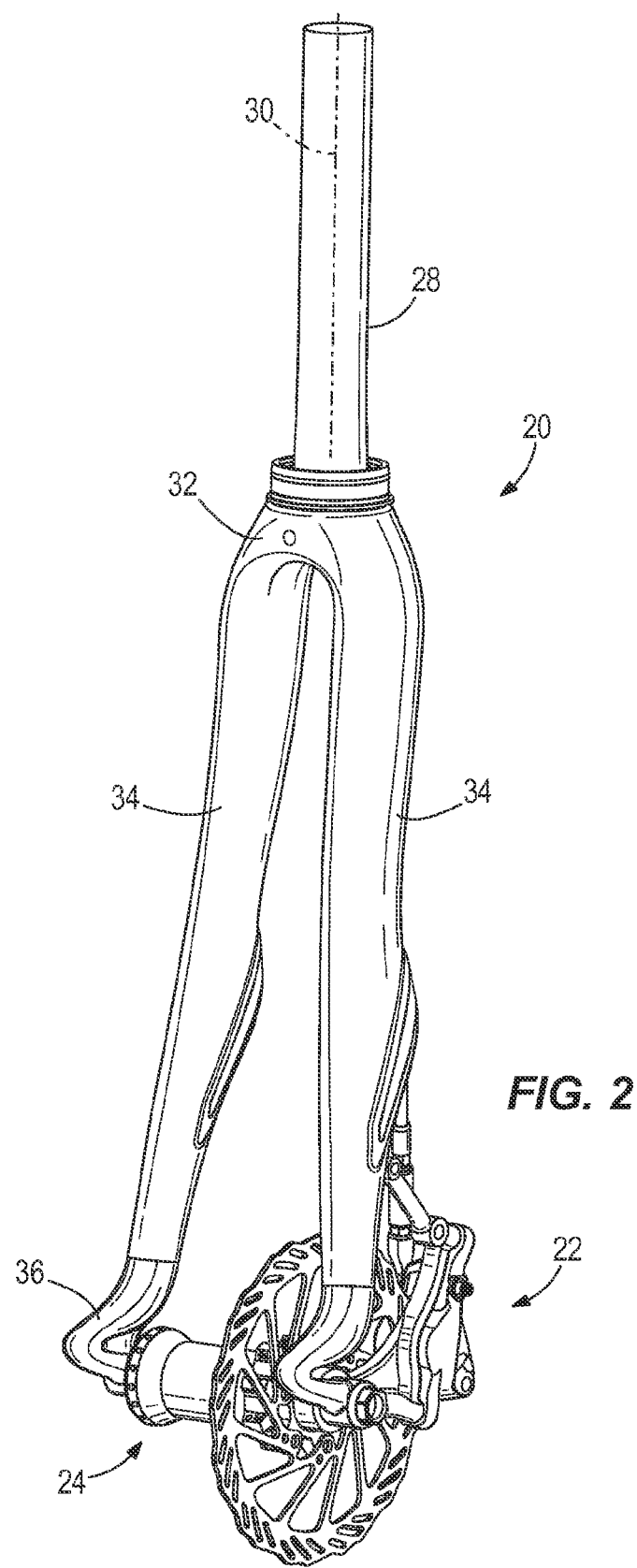
FIG. 2 is a perspective view of a bicycle front fork, brake, and hub assembly embodying the present invention.
Figure 3:
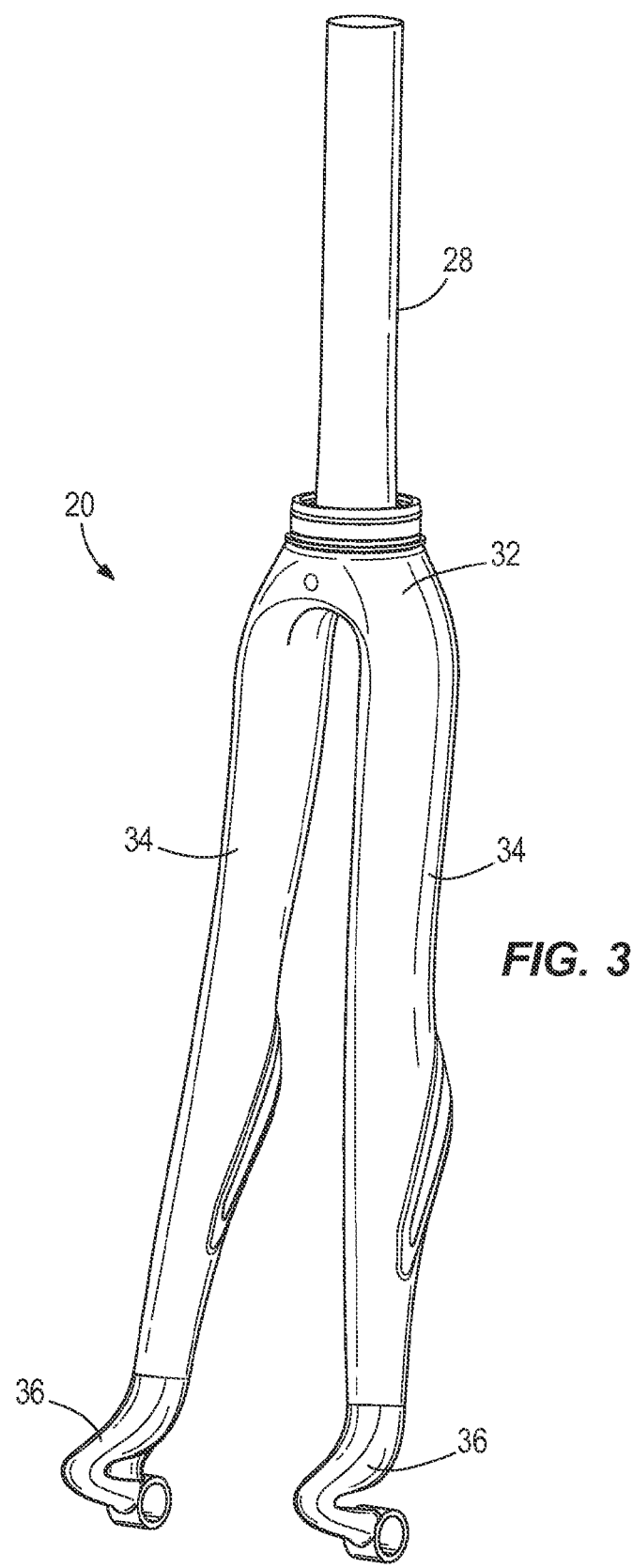
FIG. 3 is a perspective view of the front fork of FIG. 2.

FIGS. 1-3 illustrates an assembly including a front fork 20, brake assembly 22, and hub/axle assembly 24 that can be mounted on a variety of different bicycles, such as the bicycle 26 of FIG. 1. When mounted to a bicycle frame, the steerer tube 28 of the front fork 20 is rotationally supported in the head tube 29 of the frame by a lower headset bearing 31, as is known in the art.

Referring to FIGS. 2 and 3, the fork 20 includes a steerer tube 28 defining a steering axis 30, a crown 32 secured to the lower end of the steerer tube 28, two fork blades 34 secured to the lower end of the crown 32, and two fork tips 36 secured to the lower end of the fork blades 34. Each of the above-referenced parts of the fork 20 can be made from a variety of different materials, such as steel, aluminum, titanium, fiber/matrix composite, or other suitable material. The above-referenced parts of the fork can be integrally formed from a single material or can be formed separately and then secured together. If formed separately, the parts can be secured to each other in a variety of different ways, such as brazing, welding, bonding, co-curing, or other suitable technique. In the illustrated embodiment, the steerer tube, blades, and fork tips are integrally formed from a carbon fiber/epoxy matrix.

Figures 4, 5:
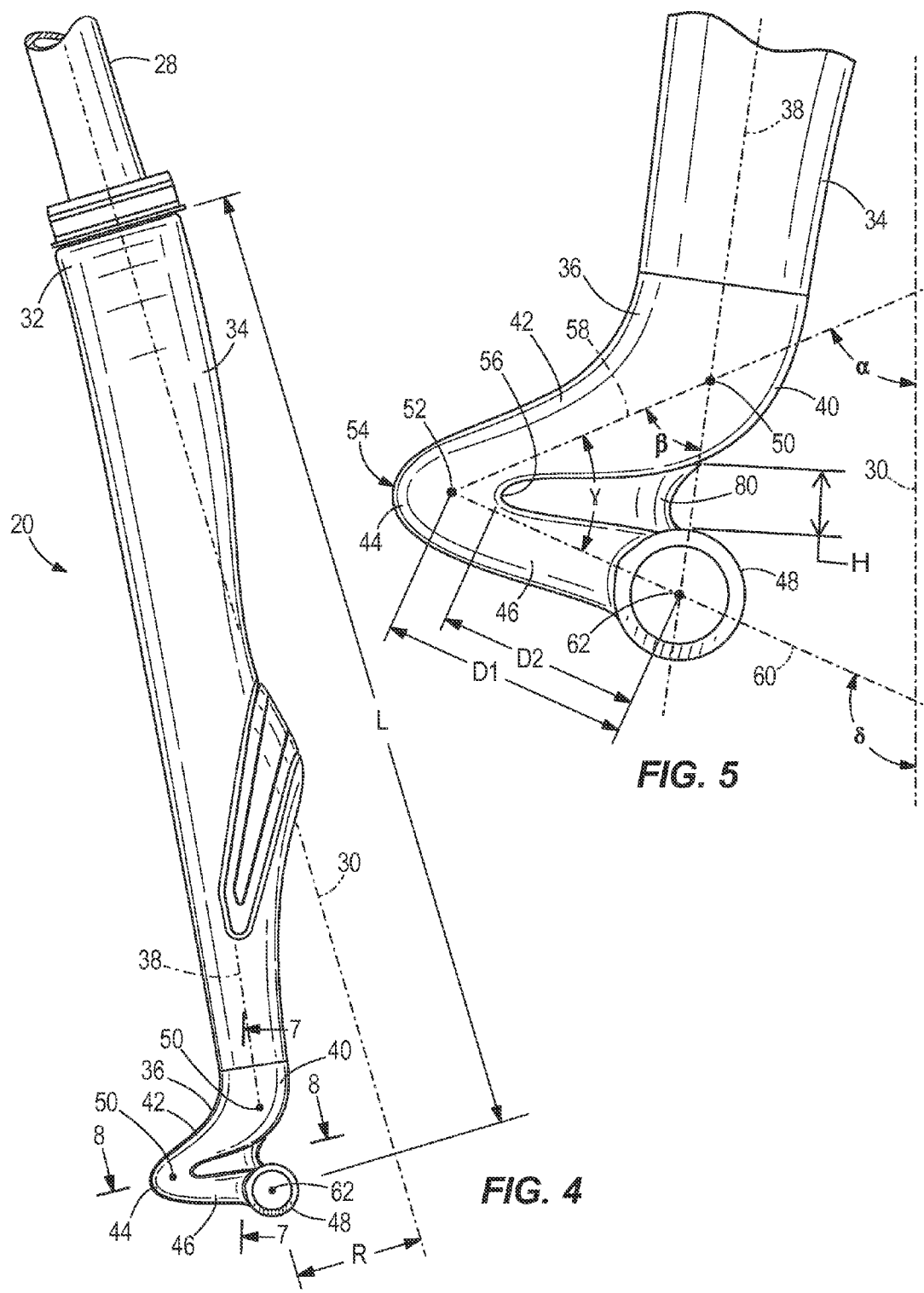
FIG. 4 is a partial side view of the fork of FIG. 2.
FIG. 5 is an enlarged side view of a fork tip of the fork in FIG. 2.
Figure 6:
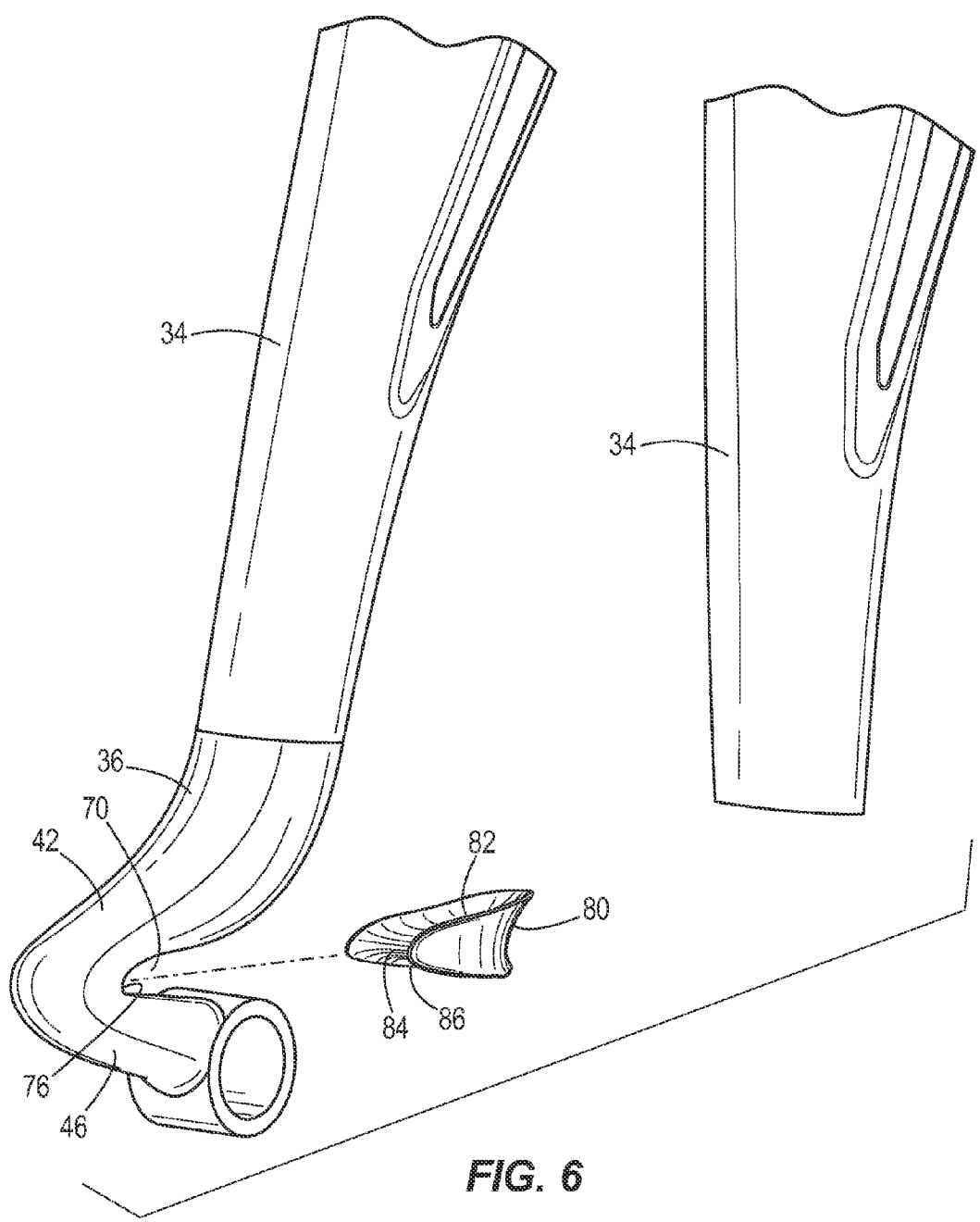
FIG. 6 is an exploded perspective view of a portion of the fork in FIG. 2.

Referring to FIGS. 3 and 4, the lower end of each fork blade 34 defines a lower blade axis 38. Each fork tip 36 includes a first elbow 40 near a lower end of the fork blade 34, a cantilevered first arm 42 extending generally forward from the first elbow 40 to a second elbow 44, and a cantilevered second arm 46 extending generally rearward and downward from the second elbow 44 to an axle support 48. The first elbow 40 defines a first center 50 aligned with the lower blade axis 38, and the second elbow 44 defines a second center 52 midway between a front surface 54 and a rear surface 56 of the second elbow 44. A centerline 58 of the first arm 42 is determined by a line that extends through first center 50 and the second center 52, and a centerline 60 of the second arm 46 is determined by a line that extends through the second center 52 and a center 62 of the axle support 48. In the illustrated embodiment, the lower blade axis 38 extends through the center 62 of the axle support 48.

The illustrated fork 20 has an effective blade length L from the lower headset bearing 31 to the center 62 of the front axle of about 369 mm and a rake R from the steering axis 30 to the center 62 of about 49 mm. The second center 52 is spaced forward of the center 62 by a distance D1 of about 38 mm, which is about 78% of the rake R.

When viewed from the side, the centerline 58 of the first arm 42 is positioned at a first steering angle α of 66° relative to the steering axis 30 and at a first blade angle θ of 59° relative to the lower blade axis 38. Also, when viewed from the side, the centerline 60 of the second arm 46 is positioned at a second arm angle γ of 45° relative to the centerline 58 of the first arm 42 and at a second steering angle δ of 114° relative to the steering axis 30. Each of the first and second arms 42, 46 is sufficiently strong and flexible to resiliently support the entire weight supported by the fork tip 36. In a preferred embodiment, the fork tip has a stiffness that results in 2 mm-4 mm of travel when riding on the expected road surface.

Referring to FIGS. 4-8, the first and second arms 42, 46 define a gap 70. In the gap 70, the first arm 42 includes a lower surface 72 that is convex, the second arm 46 includes an upper surface 74 that is convex, and the second elbow 44 includes a rear surface 76 that is convex. The gap 70 has a depth D2 from the center 62 to the rear surface 76 of about 31 mm, which is about 63% of the rake R. The gap 70 also has a height H between the axle support 48 and the first arm 42 of about 10 mm, which is about 2.7% of the effective blade length L.

The fork 20 further includes a resilient member 80 positioned in the gap 70. The resilient member 80 provides additional resilient support to the fork tip 36. The resilient member 80 includes an upper concave surface 82 shaped to receive the convex lower surface 72, a middle concave surface 84 shaped to receive the convex rear surface 76, and a lower concave surface 86 shaped to receive the convex upper surface 74. The upper, middle, and lower concave surfaces 82, 84, 86 are contiguous with each other. As a result of the illustrated and described arrangement, the resilient member 80 is shaped to fit completely and securely within the gap 70.

The illustrated resilient member 80 comprises a polyurethane elastomer having a hardness less than the hardness of the first and second arms 42, 46. In the preferred embodiment, the resilient member 80 is permanently secured in the gap 70, such as by adhesive. Alternatively, the resilient member can be held in place in any other appropriate manner, such as using an interference fit, mechanical engagement, or fasteners.

The resilient member 80 can be secured in the gap 70 in such a manner that it can removed from the gap 70 by the user so that a different resilient member can be used. For example, if the resilient member 80 becomes damaged or worn, a replacement resilient member can be substituted. Alternatively, if it is desired to achieve a different resiliency, a resilient member having a different stiffness can be used. For example, if it desired to increase the stiffness of the fork tip 36, a resilient member having less resiliency can be substituted into the gap 70. Such a replacement resilient member could use a stiffer material or a thicker cross-section, for example.

Figure 7:
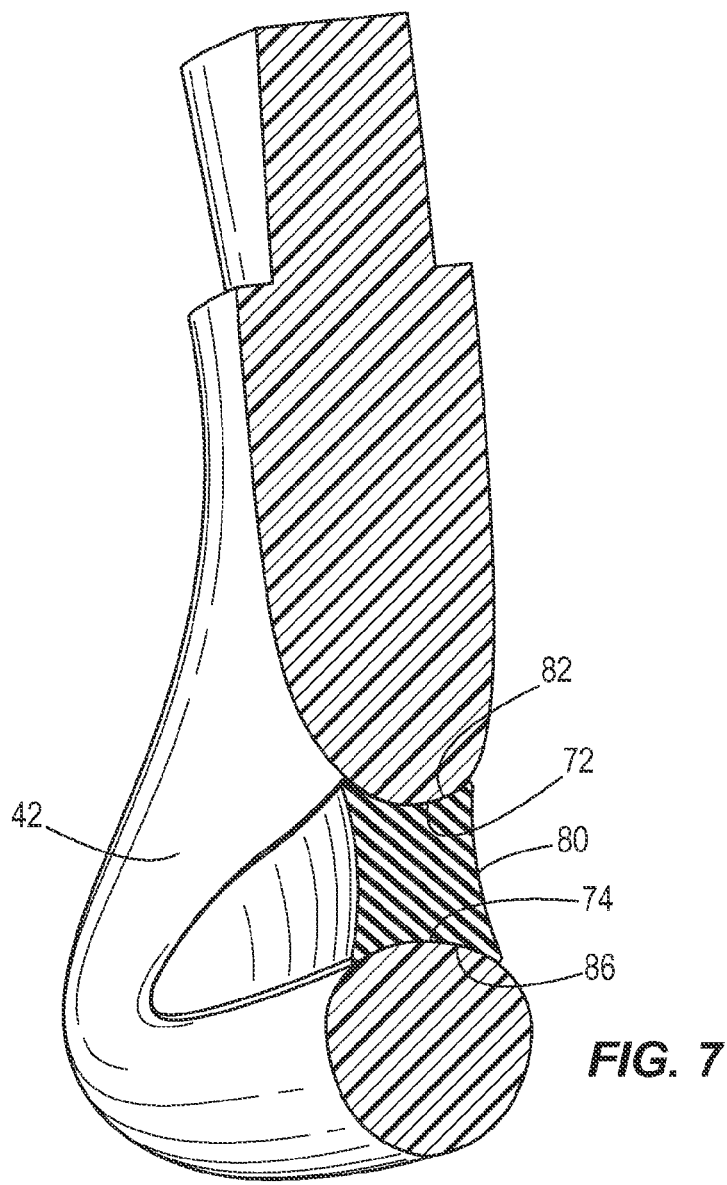
FIG. 7 is a section view taken along line 7-7 in FIG. 4.
Figure 8:
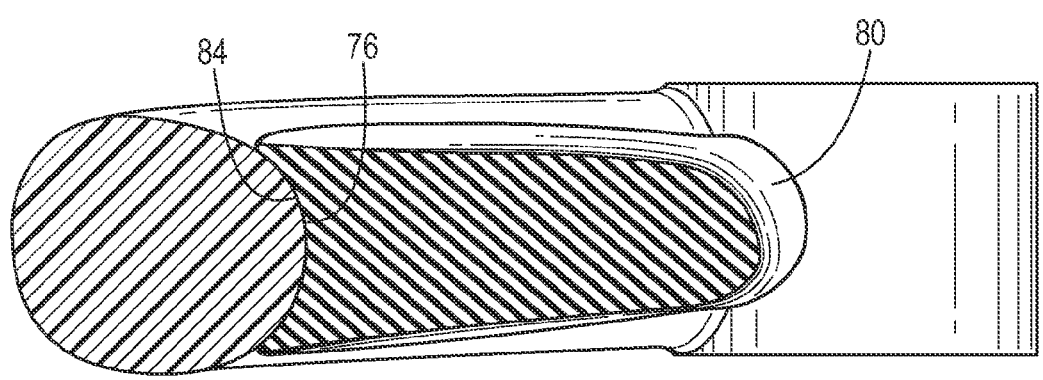
FIG. 8 is a section view taken along line 8-8 in FIG. 4.
Figure 9:
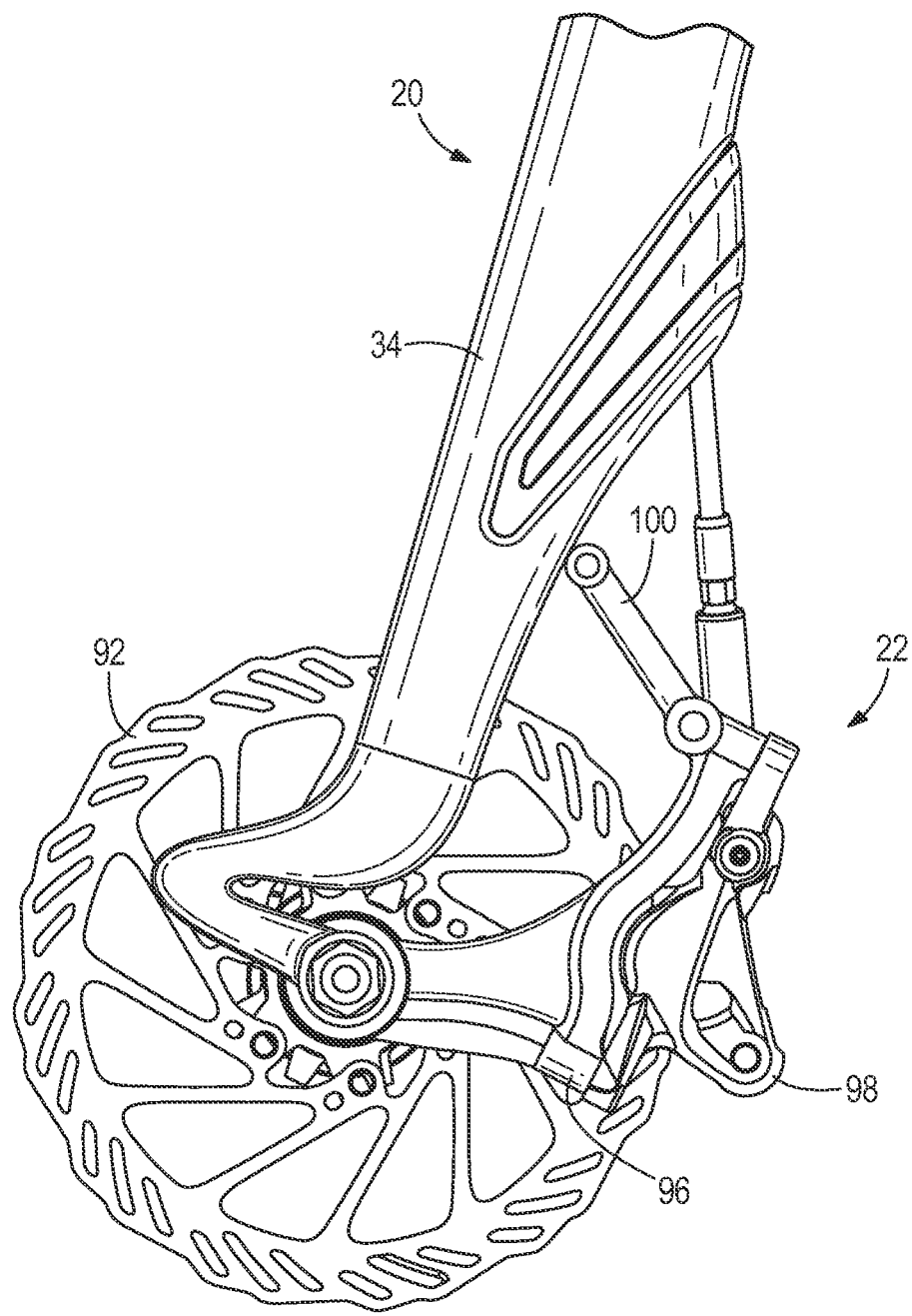
FIG. 9 is a left side view of a portion of the assembly of FIG. 2.
Figure 11:
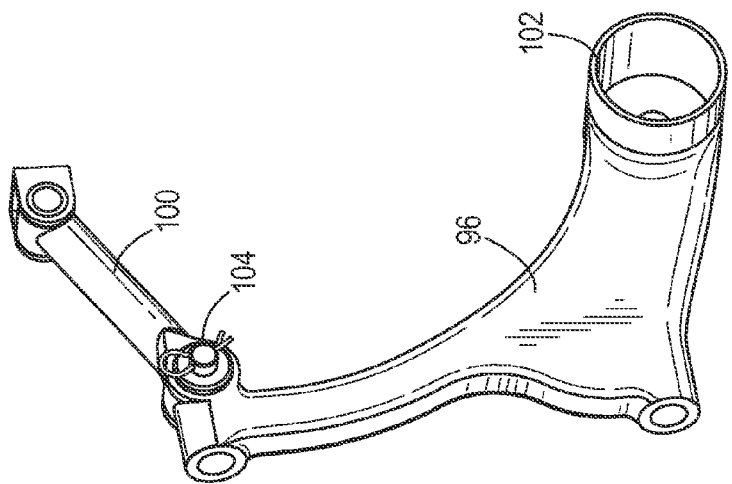
FIG. 11 is a perspective view of a caliper mount of the assembly of FIG. 2.
Figure 10:
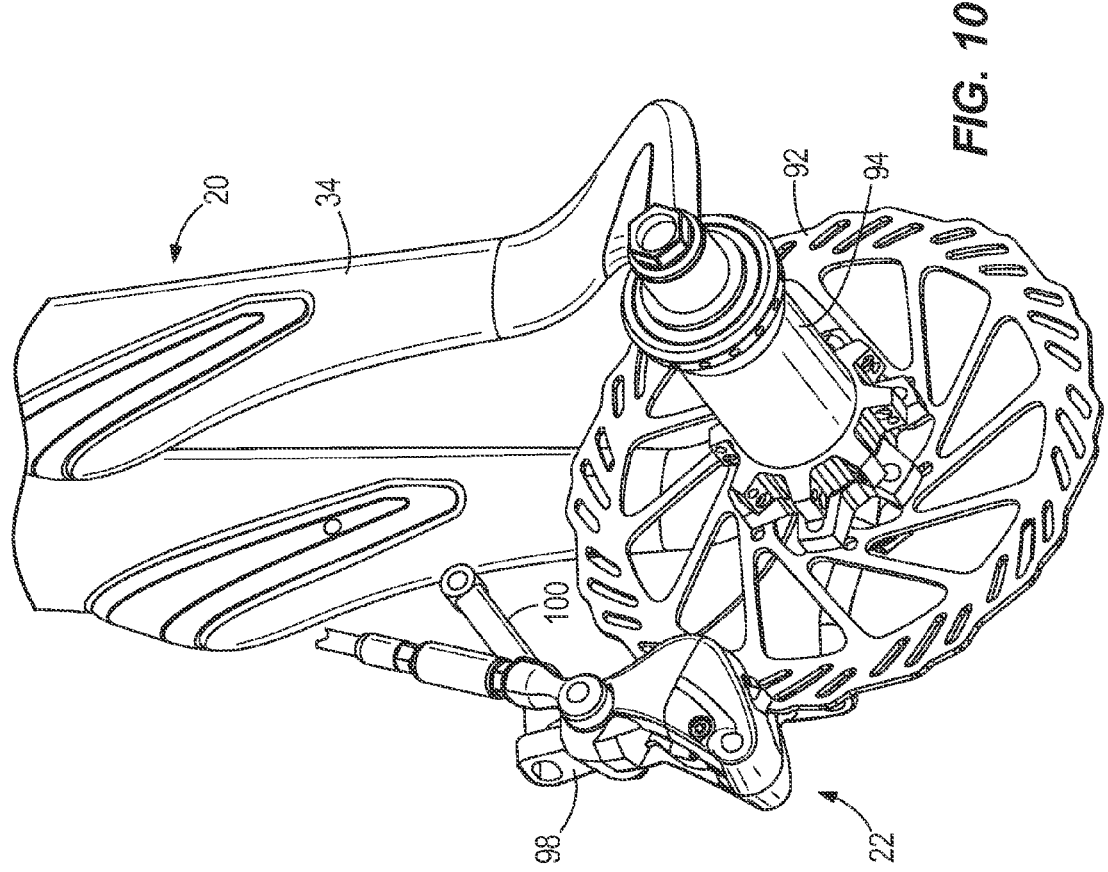
FIG. 10 is a right rear perspective view of the assembly of FIG. 2.

Referring to FIGS. 7-9, the brake assembly 22 includes a brake disc 92 mounted to a hub 94 and rotatable with the front wheel, a caliper mount 96, a caliper 98, and a link 100. The caliper mount 96 includes a hub mount 102 rotationally coupled to the hub 94 and movable with the hub 94 as the fork tip 36 resiliently flexes. The caliper mount 96 further includes an upper mount 104 pivotally coupled to one end of the link 100. The other end of the link 100 is pivotally coupled to one of the fork blades 34 to thereby facilitate movement of the caliper mount 96 (and the caliper 98 mounted on the caliper mount 96) relative to the fork blades 34 as the fork tip 36 flexes. Preferably one end of the link 100 has a detachable pivot (e.g., a pin and clip) that facilitates disconnection without the need for tools. In this manner, when the wheel is removed, the detachable pivot is disconnected, and the caliper mount 96 and caliper 98 will stayed coupled to the hub 94 when the wheel is removed. Such a design maintains the position of the caliper 98 relative to the disc 92, thereby alleviating the need to re-align those two parts.

Various features of the invention are set forth in the following claims.

The invention claimed is:

1. A bicycle comprising:
   front and rear wheels;
   a frame supported on the front and rear wheels and including a front fork, the front fork comprising:
   a steerer tube defining a steering axis;
   a fork blade coupled to and extending downward relative to the steerer tube;
   a fork tip coupled between the fork blade and the front wheel, the fork tip including:
   a first arm extending at a first angle of 20 to 100 degrees relative to the steering axis;
   a second arm extending at a second angle of 50 to 140 degrees relative to the steering axis; and
   an axle support coupled between the second arm and the front wheel,
   wherein the first arm and second arm cooperatively define a gap, and the fork tip further includes a resilient member positioned in the gap.

2. A bicycle as claimed in claim 1, wherein the first arm is cantilevered generally forward from the fork blade.

3. A bicycle as claimed in claim 2, wherein the second arm is cantilevered generally rearward from the first arm to define a gap between the first and second arms.

4. A bicycle as claimed in claim 1, wherein the first angle is 40 to 85 degrees.

5. A bicycle as claimed in claim 1, wherein the first angle is about 66 degrees.

6. A bicycle as claimed in claim 1, wherein the second angle is 70 to 120 degrees.

7. A bicycle as claimed in claim 1, wherein the second angle is about 114 degrees.

8. A bicycle as claimed in claim 1, wherein the first arm includes a convex surface and the resilient member includes a concave surface configured to receive the convex surface.

9. A bicycle comprising:
   front and rear wheels, the front wheel having an axle and a hub rotatable on the axle;
   a frame supported on the front and rear wheels and including a front fork, the front fork comprising:
   a steerer tube defining a steering axis;
   a fork blade coupled to and extending downward relative to the steerer tube; and
   a fork tip coupled between the fork blade and the front wheel, the fork tip including an arm coupled to and cantilevered from the axle, the arm having an axle support configured to attach to the axle; and
   an element disposed between the fork and the front wheel, the element coupled to the fork adjacent only a lower end of the fork blade, and the element having a resilient portion configured to resiliently respond to an impact force acting on the front wheel.

10. A bicycle as claimed in claim 9, wherein the arm includes a first arm and a second arm, and wherein the first and second arms cooperatively define a gap, and wherein the fork tip further includes a resilient member positioned in the gap.

11. A bicycle as claimed in claim 10, wherein the first arm includes a convex surface and the resilient member includes a concave surface configured to receive the convex surface.

12. A bicycle as claimed in claim 9, wherein the bicycle further includes a brake disc coupled for rotation with the front wheel, and a brake caliper rotationally coupled to the hub.

13. A bicycle as claimed in claim 12, wherein the brake caliper is coupled to the front fork by a link, and wherein the link is pivotally coupled to the brake caliper and pivotally coupled to the front fork.

14. A bicycle as claimed in claim 13, wherein the link includes a detachable pivot that facilitates disconnection of the pivot without the need for tools to thereby facilitate removal of the front wheel with the caliper.

15. A bicycle as claimed in claim 9, wherein the arm defines at least a part of the resilient portion exterior of the fork, and wherein the arm is flexible in response to an impact force acting on the front wheel.

16. A bicycle comprising:
a wheel having an axle and a hub rotatable on the axle;
a frame supported on the wheel by a fork cantilevered relative to the axle;
an element extending between the fork and the axle, the element having a resilient portion positioned exterior of the fork, and the resilient portion resiliently movable in response to an impact force acting on the front wheel;
a brake disc coupled for rotation with the wheel; and
a brake caliper rotationally coupled to the axle, the brake caliper having an axle mount that is coupled to the axle and a frame mount that is detachable without the need for tools to thereby facilitate removal of the front wheel from the frame with the brake caliper.

17. A bicycle as claimed in claim 16, wherein the brake caliper has a frame mount, and wherein the frame mount comprises a link connecting the brake caliper to the frame.

18. A bicycle as claimed in claim 17, wherein the link is pivotally coupled to the brake caliper and pivotally coupled to the frame.

19. A bicycle as claimed in claim 18, wherein the link includes a detachable pivot that facilitates disconnection of the pivot without the need for tools to thereby facilitate removal of the front wheel with the caliper.

* * * * *